May 8, 1956  W. SCHMID  2,744,521
METHOD AND SYSTEM FOR OBSERVING MOTION
PHENOMENA IN LIVING BODIES
Filed Aug. 5, 1952  3 Sheets-Sheet 2
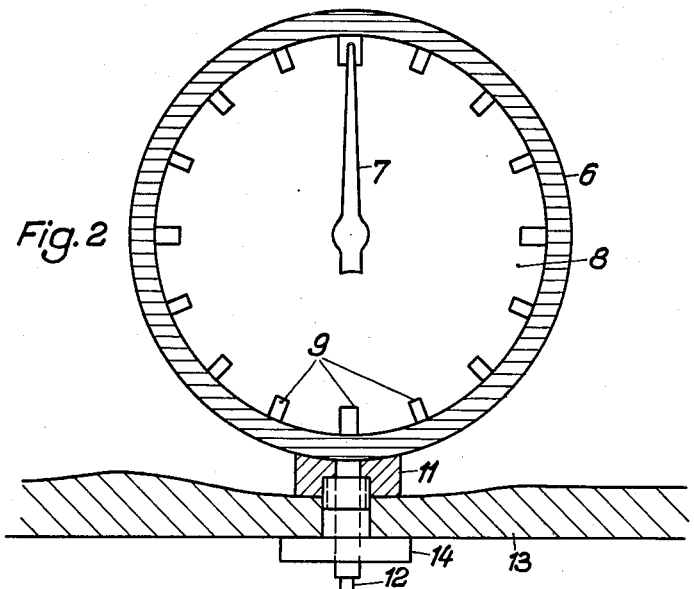
Inventor:
Wolfgang Schmid
by [signature]
attorney

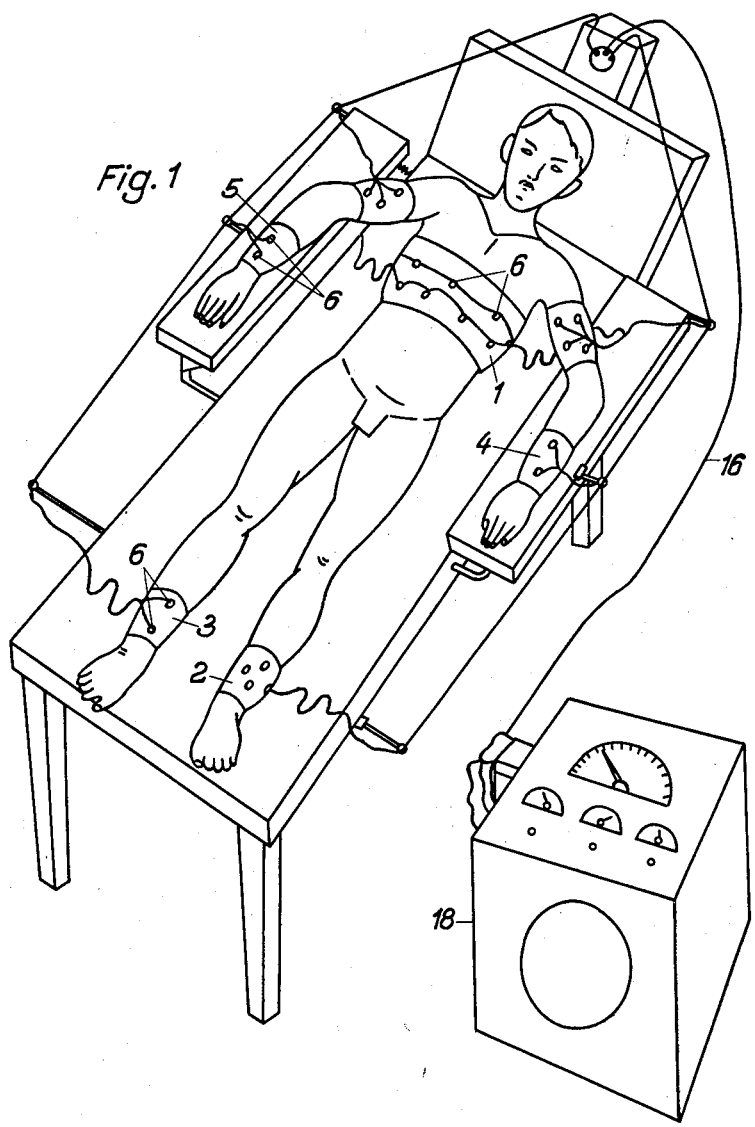

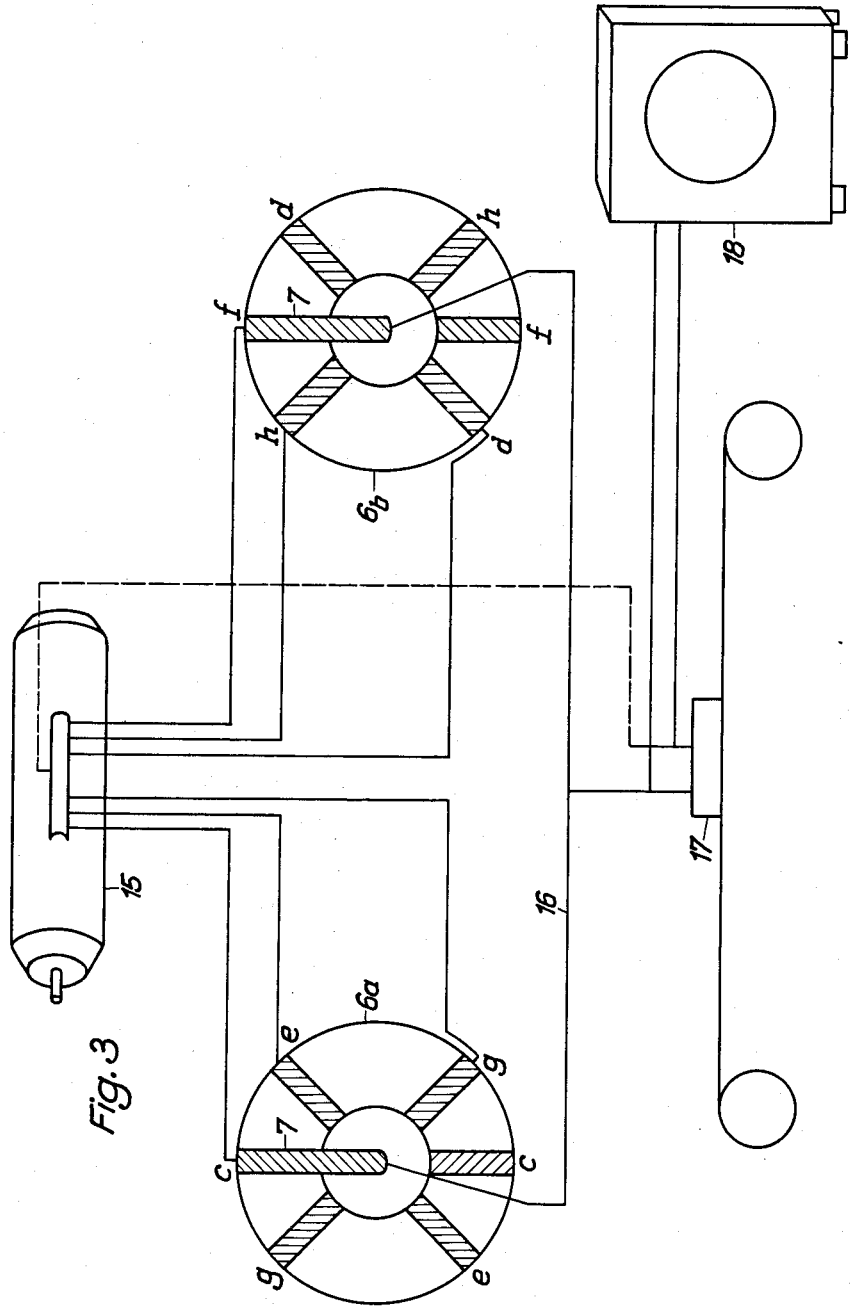

United States Patent Office 2,744,521
Patented May 8, 1956

2,744,521

METHOD AND SYSTEM FOR OBSERVING MOTION PHENOMENA IN LIVING BODIES

Wolfgang Schmid, Riederau am Ammersee, Germany

Application August 5, 1952, Serial No. 302,757

3 Claims. (Cl. 128—2)

It is usual in medical examination to observe for diagnostic purposes such movements in a living organism which are acoustically perceptible (heart sounds) or can be gaged by feeling (pulse). While observations of this nature are very important for diagnosis, they can, however, not serve as a basis for a more comprehensive judgment on the condition of the organism as a whole. It is thus, for example, not possible to detect changes in the activity of the heart by simply ausculting the heart sounds, nor can the movement of the blood in the principal veins be ascertained by feeling the pulse.

It is an object of the invention to extend observation of the movement of the blood in a living organism and thus to provide a broader base for diagnosis.

The method, according to the invention, of observing movement of the blood in a living organism comprises translating the movement into a series of oscillations within the aural zone by means of a pressure sensitive pick-up member, and rendering it acoustically perceptible by means of a reproducing device. As far as movements associated with corresponding sound generation are concerned, a microphone may be used for picking-up, while for inaudible movements the pick-up pressure is used for controlling a connected source of frequency.

Reproduction of the series of electrical oscillations may be effected directly by means of a loudspeaker, it being, however, also possible to register them in the form of a magnetophonic record or by means of optical or mechanical sound recording (sound track, phonograph record), and to hold them available for subsequent reproduction as desired.

The above described method may be extended and improved by simultaneously picking up a plurality of movements, using separate pressure sensitive pick-up members, and translating said movements into different series of oscillations within the aural zone.

These last mentioned picking-up procedures make it possible to render audible very small movements occurring in quick succession, such as the alternating dilations and contractions of the blood conducting vessels. By observing the deformation of the blood vessels at different points of the body it is further possible to follow the succession of movements in the whole organism.

The apparatus for carrying into effect the method according to the invention when using only one point of observation comprises a pressure sensitive pick-up member to be applied to the living organism, a source of audio-frequency, and a device for effecting acoustic reproduction, said device being connected to the source of audio-frequency across the pick-up member. The source of audio-frequency in this arrangement is of course unnecessary in cases where an audible movement is to be observed, and where a microphone can be used as a pressure sensitive pick-up member. In fact, all devices capable of emitting a control pulse under the effect of pressure may be used as pressure sensitive pick-up members. Generally it will be advisable to construct the pressure sensitive pick-up member as a multi-position contact switch, the contact members of the switch advantageously taking the form of a pointer and of a disc provided with a plurality of contact points. This construction of the contact switch is especially to be recommended when using a multiple frequency generator as part of the arrangement, the contact points of the switch being connected to the multiple frequency generator in such a manner, that different series of oscillations are transmitted as regards the frequency, and consequently a tone cycle is produced when reproduction is effected.

For simultaneous observation of a plurality of movements the invention proposes an arrangement comprising a plurality of pick-up members to be applied to the living organism, and a multiple frequency generator common to all pick-up members, the arrangement being such, that different frequencies, respectively different frequency groups of the generator are associated with the pick-up members. Such an arrangement is to be recommended, for example, when the blood circulation in the living organism is to be observed. It is thereby possible to observe the various movements at a plurality of pick-up points and to render them audible by means of different tones or different tone cycles.

When observing a plurality of movements, another arrangement according to the invention may comprise a plurality of inductive means, especially plunger coils, to be applied to the living body and constructed as pick-up members, said inductive means being connected to a common source of audio-frequency in such a manner, that they control the frequency of reproduction dependent on the pick-up pressure. In this case the audio-frequencies transmitted at the various pick-up points may be different. The same method of observation may be realised by means of an arrangement comprising a plurality of capacitive means, for instance variable condensers, capable of being applied to the living body and constructed as pick-up members, said capacitive means connected to a common source of audio-frequency in such a manner, that they control the frequency of reproduction dependent on the pick-up pressure.

In order to facilitate observation and evaluation of the acoustic reproduction of the pick-up impulses, the invention proposes to complete the apparatus by means of a model of the living organism provided, according to the distribution of pick-up points on the living body, with loudspeakers for reproduction of the frequency or frequency groups transmitted by the pick-up members. This auxiliary device may, instead of the loudspeaker, also be provided with pilot lamps controlled from the pick-up points in such a manner, that their light intensity varies according to the amplitude of the frequency of electric oscillation.

In the following the invention is to be explained in more detail with reference to the attached drawings in which Fig. 1 shows the apparatus according to the invention connected to the body of a patient;

Fig. 2 is an illustration of a pressure sensitive pick-up member;

Fig. 3 is a wiring diagram of the complete apparatus;

Fig. 4 illustrates the tone cycle produced upon rotation of the pick-up member illustrated at the left, when the movable contact of said pick-up member executes a clockwise rotation;

Fig. 5 shows a tone cycle contrary to the one shown in Fig. 4, which is produced by counter-clockwise rotation of the slip contact;

Fig. 6 is illustrative of a tone cycle produced by slow rotation of the slip contact, and Fig. 7 shows a tone cycle produced when connecting a plurality of pick-up members to the reproducing device.

As can be seen from Fig. 1, there are applied to the body of the patient various bandages 1, 2, 3, 4, 5 which advantageously take the form of elastic rubber bandages. Each bandage is provided with one or more pressure sensitive pick-up members 6, which translate the variations in pressure acting on them into a series of electric oscillations within the aural zone, thus making the movement acoustically perceptible by means of a reproducing device. According to Fig. 2, each pick-up member 6 comprises a multi-position contact switch having a pointer-shaped sliding contact 7 rotatable over a disc 8 provided with a plurality of contact points 9, the number of contact points 9 of the plurality being any selected even number. The sliding contact is mechanically connected with a pick-up disc 10 in such a manner that is executes a clockwise rotation when pressure on the disc 10 is increased, but returns to its original position on cessation of the pressure increase under the effect of an elastic force, thereby executing a counter-clockwise rotation. The pick-up member 6 comprises a boss 11 through which passes the shaft 12 of the disc 10, said boss permitting fastening of the pick-up member to the rubber band 13 of one of the bandages by means of the nut 14.

The wiring diagram of the complete apparatus, including the measuring, recording and ausculting devices thereof, is shown in Fig. 3. In this arrangement are provided two pick-up members 6a and 6b having six radial contact points over which the slide contact 7 slides to conductively engage therewith. Each pair of diametrically opposite contacts is conductively interconnected. The radial contacts are connected to a common multiple frequency generator 15, a predetermined frequency being assigned to each pair of diametrically opposite contacts. It is assumed that the frequency of the tone c is assigned to the first pair of contacts, the frequency of the tone e to the second pair, and the frequency of the tone g to the third pair. The contacts of the pick-up member 6a are accordingly designated c, e and g. As the sliding contact 7 of the pick-up member 6a engages the contacts c, e, and g during its rotation, it transmits the corresponding frequencies over the conductor 16 to a sound recording device 17 on the one hand, and to a loudspeaker 18 on the other.

The construction of pick-up member 6b is similar to that of pick-up member 6a. Its contacts are connected in pairs to the frequencies f, d, h of the frequency generator 15. The sliding contact 7 of the pick-up member 6b is also conductively connected to the sound recording device 17 and to the loudspeaker 18.

As can be seen from Fig. 1, the reproducing device comprising the loudspeaker 18 is provided with the necessary operating and control members, which permit switching the apparatus on and off, as well as an adjustment of its sensitivity. Fig. 4 is illustrative of the tone cycle which is produced by operating the pick-up member 6a of Fig. 3 with the sliding contact 7 of this pick-up member rotating clockwise.

According to the magnitude of this rotation the tone cycle, c, e, g is transmitted to the reproducing device one or more times; during the return movement of the contact 7 the tone cycle is reversed as shown in Fig. 5. The number of the tone cycles c, e, g, respectively g, e, c depends on the variation in the magnitude of the pick-up pressure. The velocity with which a tone cycle is produced is dependent on the increase, respectively decrease, of pressure during pick-up. Fig. 6 illustrates the tone cycle, c, e, g corresponding to the one shown in Fig. 4, as it is produced upon slow increase of pressure and correspondingly slow rotation of the contact 7 of the pick-up member 6a of Fig. 3. When both pick-up members 6a and 6b of Fig. 3 are operating simultaneously, the two tone cycles c, e, g, and f, d, h are being reproduced together.

Fig. 7 shows by way of example the combination of four tone cycles occurring in the sequence corresponding to their respective pressure effects, and being reproduced in the same sequence. It is therein assumed, that the tones of group I represent the heart sounds capable of being recorded directly, while the tones of groups II, III and IV are associated with pick-up points applied to the blood vessels at progressively increasing distance from the heart. Consequently, the four tone cycles afford a possibility of observing and evaluating the blood circulation, it being of advantage to select the frequencies for the various tone cycles in such a manner, that they increase with increasing distance from the principal pick-up point.

The apparatus according to the invention permits observation without delay of the changes in blood circulation caused by a medicine taken by the patient or brought about by other influences. Thus the apparatus is a valuable help for establishing a diagnosis, as well as for the continuous observation of a patient during an operation.

What I claim is:

1. The method of observing the circulation of blood in a living organism comprising the steps of measuring the variations in pressure of the circulating blood at a plurality of spaced portions of the living organism, translating each measure of the pressure variations into an audible frequency characteristic of the magnitude of the pressure variation, and simultaneously reproducing the frequencies.

2. The method of observing the circulation of blood in a living organism comprising the steps of determining the variations in pressure of the circulating blood at a plurality of spaced portions of the living organism, and causing each determination selectively to energize the electric circuit of a source of variable audio frequency at a frequency indicative of the magnitude of the pressure variation.

3. Apparatus for observing the circulation of blood in a living organism comprising a plurality of pressure indicating devices, a plurality of means each of which is adapted to position at least one of the plurality of indicating devices in cooperative relation with spaced regions of the living organism, each indicating device having a contact adapted to be moved in accordance with the pressure to which the device is subjected, a plurality of fixed contacts arranged to be engaged successively by the movable contact, and a multifrequency audio generator of which the frequency steps are connected between the movable contact in common and the fixed contacts individually.

References Cited in the file of this patent

Publication: Medical Physics, by Glasser, 1944, pp. 212–215. (Copy in Division 55.)